United States Patent
Hillenmayer et al.

(10) Patent No.: US 7,000,462 B2
(45) Date of Patent: Feb. 21, 2006

(54) SYSTEM FOR MONITORING A VEHICLE WITH PNEUMATIC TIRES, SIGNAL ANALYSIS METHOD, AND VEHICLE TIRE

(75) Inventors: Franz Hillenmayer, Burglengenfeld (DE); Gregor Kuchler, Thalmassing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/985,516

(22) Filed: Nov. 10, 2004

(65) Prior Publication Data

US 2005/0097949 A1    May 12, 2005

(30) Foreign Application Priority Data

Nov. 11, 2003   (DE)   ................................ 103 52 539

(51) Int. Cl.
*B60C 23/02*   (2006.01)

(52) U.S. Cl. .................................................... 73/146.5

(58) Field of Classification Search ................. 73/146, 73/146.4, 146.5, 146.2, 146.3, 146.8, 714; 340/442–448; 152/152.1
See application file for complete search history.

(56) References Cited

U.S. PATENT DOCUMENTS

| | | | |
|---|---|---|---|
| 5,546,070 A | 8/1996 | Ellmann et al. | |
| 6,275,148 B1 * | 8/2001 | Takamura et al. | .......... 340/442 |
| 6,339,956 B1 * | 1/2002 | Huinink et al. | ............... 73/146 |
| 6,505,515 B1 * | 1/2003 | Delaporte | ..................... 73/714 |
| 2003/0010108 A1 | 1/2003 | Goslar et al. | |
| 2003/0046992 A1 | 3/2003 | Caretta | |
| 2003/0058118 A1 | 3/2003 | Wilson | |
| 2003/0201044 A1 | 10/2003 | Schick | |

FOREIGN PATENT DOCUMENTS

| | | |
|---|---|---|
| DE | 43 29 591 C2 | 3/1995 |
| DE | 198 07 004 A1 | 9/1999 |
| DE | 101 46 031 A1 | 4/2003 |
| DE | 102 53 367 A1 | 6/2004 |
| WO | 02/092364 A2 | 11/2002 |
| WO | 03/016078 A1 | 2/2003 |
| WO | 03/091046 A1 | 11/2003 |

\* cited by examiner

*Primary Examiner*—William Oen
(74) *Attorney, Agent, or Firm*—Laurence A. Greenberg; Werner H. Stemer; Ralph E. Locher

(57) ABSTRACT

A system for monitoring a vehicle fitted with pneumatic tires has, on at least one wheel of the vehicle, a pressure sensor for sensing the tire inflation pressure, and a deformation sensor joined to the tire for sensing deformations of the tire. A data transmission device transmits the output signals from the sensors to an analysis device, which determines from the output signals a result in dependence on the output signals from the two sensors. Frequency-dependent analysis is employed to derive, from the output signals from the deformation sensor, a signal corresponding to the static loading on the tire and a signal corresponding to the nature of the road surface.

18 Claims, 1 Drawing Sheet

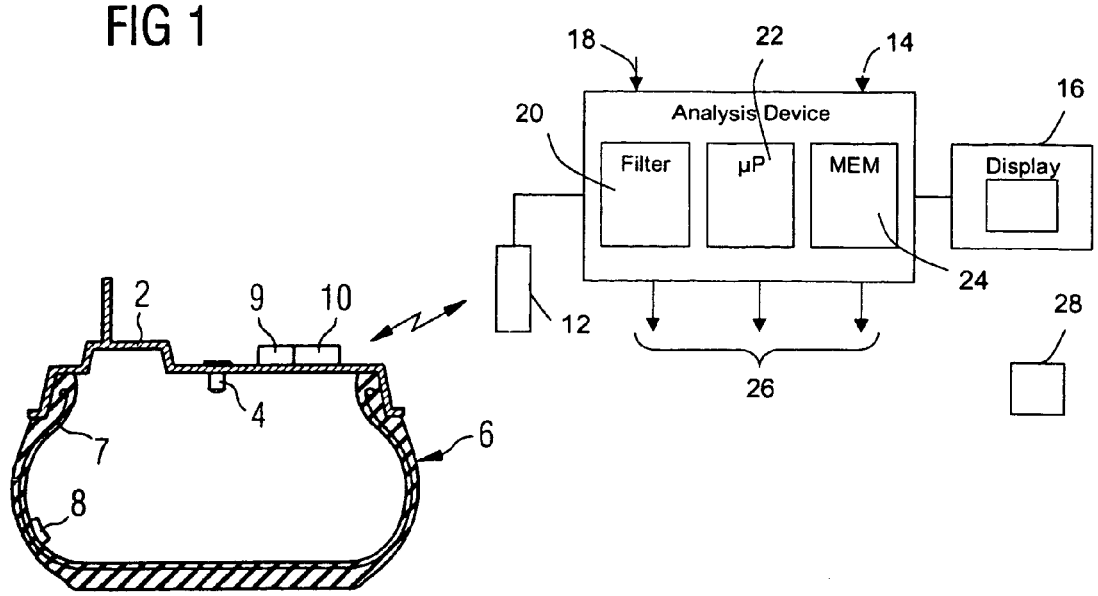
FIG 1
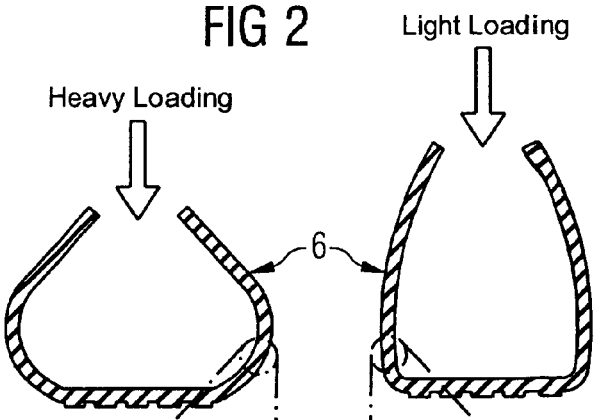
FIG 2
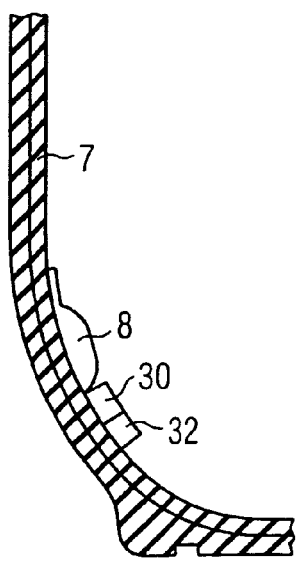
FIG 3
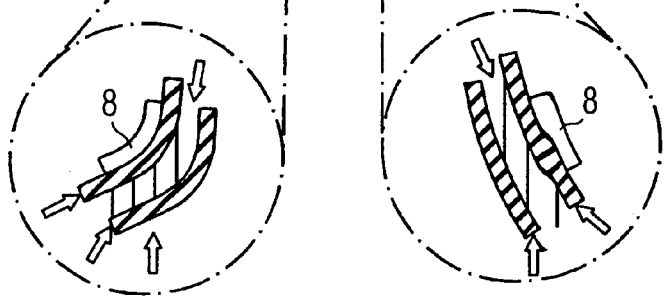

SYSTEM FOR MONITORING A VEHICLE WITH PNEUMATIC TIRES, SIGNAL ANALYSIS METHOD, AND VEHICLE TIRE

BACKGROUND OF THE INVENTION

Field of the Invention

The invention relates to a system for monitoring a vehicle with pneumatic tires. The invention further relates to a method for analyzing a deformation sensor affixed in or on the sidewall of a pneumatic tire on a vehicle, together with a vehicle tire.

Fault-free tire condition is important for the roadworthiness of vehicles, in particular motor vehicles. Motor vehicle manufacturers recommend desired tire pressures. The desired pressure recommendations vary according to the tire size, vehicle load, vehicle speed, and the nature of the road surface concerned. Hence, to give the driver a warning which is exact and appropriate to the situation, a tire pressure checking system should adjust its warning behavior for the vehicle loading, vehicle speed, and the road surface concerned, with the tire size being input into the system beforehand.

Prior art tire pressure checking systems provide no way of adapting the alarm, which informs the vehicle driver of a faulty tire pressure, appropriately for the nature of the road surface.

Adaptation for the loading state is effected with the help of load sensors. Adaptation for the tire pressure is effected by means of pressure sensors. The vehicle speed is known in the vehicle. There is no provision for determining the nature of the road surface. If the nature of the road surface is extreme, for example when driving off-road, the tire pressure checking device will then, for example, warn the vehicle driver prematurely. At tire pressures close to the warning threshold of the tire pressure control system, it is possible for no warning to be triggered even though the tire pressure is too low for the prevailing conditions, or for an alarm to be triggered even though the tire pressure is still within the values specified by the vehicle manufacturer as permissible for the prevailing conditions.

Patent application publication US 2003/0046992 A1 describes a system for monitoring the deformation of a rolling vehicle tire, in which the deformation of the tire is measured by means of a sensing device, mounted on the wheel in the interior of the tire, which determines the distance between various places on the inner side of the tire and a sensor. The measured values are used to determine the vertical, lateral and longitudinal forces in the tire.

International PCT publication WO 2003/016078 describes a method and a device for the monitoring and wireless signaling of any pressure change in pneumatic vehicle tires, and for their automatic pressure regulation. Sensing electronics are arranged in the interior of the tire to determine the tire pressure. The loading of the tire concerned can be determined while the vehicle is stationary by a special sensing system.

In patent application publication US 2003/0010108 A1, magnetic elements are disposed in a sidewall of a tire along two radially separated tracks around the tire, with the help of which it is possible in particular to determine tangential deformations of the tire.

German published patent application DE 101 46 031 A1 describes a method for the determination of the pneumatic pressure in a tire and the wheel load on vehicle tires by analyzing measurement signals supplied by at least one deformation sensor embedded in the vehicle tire, in which recordings are made for a specified tire type of the time-traces of the signals concerned when the deformation sensor passes through the road contact point, as the tire pressure, wheel load and suspension adjustment are varied and measured, and the widths of the signal graphs between zero-crossings of the signal time-trace are recorded, together with the amplitude minima of the signal time-trace. From the data obtained, sets of characteristics are determined, from which in turn the value concerned can be read off for an actual measurement.

In a commonly assigned development (see non-prior art German published patent application DE 102 53 367 A1), there is provided a tire measurement device with a piezo-electric fiber or fiber network integrated in the tire. The piezo-electric fiber can be used both as a sensor and also as an energy source for other sensors, for example a temperature or pressure sensor.

International PCT publication WO 03/091046 A1, and the corresponding patent application publication US 2003/0201044 A1, describe a vehicle monitoring system in which temperature sensors arranged in the region of the shoulder of the tire are of crucial importance, for use in enabling damage to the tire to be recognized.

German published patent application DE 198 07 004 A1 describes a sensor system and a method for the monitoring or measurement, as applicable, of the adhesion between the vehicle tire and road surface and other physical data for the tire, for which the sensor element itself is integrated into the treadwall or carcass of the tire and, in particular, tangential forces within the treadwall are sensed.

International PCT publication WO 03/016078 A1 describes a tire pressure regulation (closed-loop control) system by which the pneumatic pressure in the tire is sensed and is automatically adjusted as a function of operating parameters.

German patent DE 43 29 591 C2, and the corresponding U.S. Pat. No. 5,546,070, describe a device for monitoring the pneumatic pressure in a tire, for which a sensor is constructed and arranged in such a way that it outputs an electrical pulse corresponding to the magnitude of the deformation of a tire when it passes through the road contact point. This sensor is constructed, for example, as a piezo-electric element integrated into the sidewall of the tire, which can serve at the same time as a sensor and as an energy source. In an analysis unit, the evaluation may use the amplitude of the output signal alone to infer the magnitude of the deformation. For greater accuracy, the evaluation unit can determine the ratio of the duration of the electrical pulse to the duration of one rotation of the wheel, and from this ratio can determine the magnitude of the deformation. By counting the pulses, the mileage life of the tire can be calculated and the wear estimated.

The definition of the instant invention starts out from international PCT publication WO 02/092364 A2 and the related patent application publication US 2003/0058118 A1. There, a vehicle and vehicle tire monitoring system has a vehicle wheel equipped with an acceleration sensor that contains deformations of the vehicle tire due to its loading when rotating on a supporting surface. The acceleration sensor is disposed within the interior of the tire, preferably in or on the treadwall, and is suitable for sensing changes in the acceleration of the tire in a radial direction. A pressure sensor is also provided, for sensing the inflation pressure of the tire. By analyzing the output signals from the acceleration sensor and the pressure sensor it is possible, for example, to determine the tire loading, the air mass contained by the tire, the vehicle mass, the weight distribution etc., and to use these quantities for a vehicle control system, in order to influence the braking system, steering system, suspension system, the torque produced by the drive motor, etc. The analysis algorithms are relatively complex, and make the assumption that the flattening is symmetrical about its mid-point, which is only so at low speeds.

SUMMARY OF THE INVENTION

It is accordingly an object of the invention to provide a pneumatic tire pressure monitoring system, a signal processing method, and a vehicle tire which overcomes the above-mentioned disadvantages of the heretofore-known devices and methods of this general type and which has a simple construction and enables the most diverse parameters, relevant for the roadworthiness of the vehicle, to be monitored.

With the foregoing and other objects in view there is provided, in accordance with the invention, a system for monitoring a vehicle with pneumatic tires, comprising:

a pressure sensor disposed to sense a tire inflation pressure of at least one wheel of the vehicle and to output a sensor output signal;

a deformation sensor for sensing deformations of a tire, joined to a sidewall of the tire at a location that is subject to strong deformation when a pneumatic pressure in the tire is too low in relation to a weight of the vehicle, said deformation sensor generating an output signal in dependence on the deformation of the sidewall;

an analysis unit;

a data transmission device for transmitting the sensor output signal of said pressure sensor and the output signal of said deformation sensor to said analysis unit;

said analysis unit including a filtering device configured to subject the output signal from said deformation sensor to low-frequency filtering in dependence on a speed of rotation of the wheel, to generate a signal substantially corresponding to a quasi-static tire deformation, and to high-frequency filtering in dependence on the speed of rotation of the wheel, to generate a signal characterizing a nature of a road surface.

In other words, the objects or the invention are achieved with the novel system. The deformation sensor which is provided in accordance with the invention for sensing deformation of the tire sidewall, in particular bending, makes it possible with the help of a filtering facility to sense both a quasi-static tire deformation and also the nature of the road surface (in particular smooth or extremely uneven road surfaces). The determination of the wheel rotation speed which is required can be effected by the deformation sensor itself, or in other ways known per se.

It is advantageous if the system according to the invention is equipped with a memory module, containing tire-specific data.

This makes it possible, using the system according to the invention to determine a considerable number of useful variables that can be utilized in the system.

There exists a tire-specific desired deformation for each tire, for which the tire exhibits good running and springing characteristics. If the actual deformation deviates from the desired deformation, in accordance with an additional feature of the invention, this is taken as a sign of incorrect pneumatic pressure.

In accordance with an added feature of the invention, the system can also be used for determining desired adjustment values for the vehicle's suspension.

In accordance with another feature of the invention, desired adjustment values can be determined for a braking device and/or a drive system on the vehicle.

In accordance with a further feature of the invention, the system can further be used for activating actuators which set the vehicle's parameters.

With the above and other objects in view there is also provided, in accordance with the invention, an analysis method for determining the static loading and the nature of the road surface from the signals output from the deformation sensor arranged in the sidewall of the tire.

The novel method includes the following method steps:

analyzing a low-frequency range of the output signal, correlating with a wheel rotation speed to generate a correlated signal, and averaging the correlated signal to generate an averaged signal, for generating from the averaged signal a signal substantially corresponding to a static loading on the pneumatic tire; and analyzing a high-frequency range of the output signal, correlating with the wheel rotation speed to generate a correlated signal, and generating, from the correlated signal, a signal representing the nature of the road surface.

With the above and other objects in view there is also provided, in accordance with the invention, a vehicle tire that is suitable for use in the above-outlined system according to the invention.

In accordance with a concomitant feature of the invention, the novel vehicle tire has its own energy supply for the sensors it contains and for the transmission of the sensor signals to the outside of the tire.

Other features which are considered as characteristic for the invention are set forth in the appended claims.

Although the invention is illustrated and described herein as embodied in a system for monitoring a vehicle with pneumatic tires, signal analysis method and vehicle tire, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 a block diagram and schematic sectional view of a The system according to the invention;

FIG. 2 is a schematic sectional and diagrammatic view of a tire subject to various loadings, illustrating how a deformation sensor located in the tire functions; and FIG. 3 is a detailed view of a section of a tire in accordance with the invention.

DESCRIPTION OF THE PREFERRED EMBODIMENTS

Referring now to the figures of the drawing in detail and first, particularly, to FIG. 1 thereof, there is shown a pressure sensor 4 affixed to the rim 2 of a vehicle wheel shown in partial cross-section. The pressure sensor 4 senses the inflation pressure prevailing in the interior of the tire 6.

In addition, a deformation sensor 8 is affixed to the tire 6 in the region of its sidewall 7.

The output signals from the sensors 4 and 8 are fed via an electronic unit 9 of a transceiver (transmit/receive) unit 10 that is fixed on the wheel. From there the signals are transmitted to a transceiver unit 12 fixed on the vehicle or its chassis, as applicable. The transceiver unit 12 fixed on the chassis is linked to an analysis device 14, downstream from which is connected a display unit 16, or which directly contains a display unit 16.

The analysis device 14 has another input 18, to which is fed a speed signal which can be obtained in diverse ways in the vehicle. The analysis device 14 contains a filter device 20, a microprocessor 22, together with program and data memory 24.

The analysis device has in addition outputs 26, of which one may for example be connected to an actuator 28 for adjusting the road clearance of the vehicle.

The pressure sensor 4 can be a pressure sensor which is known per se, which either directly contains an electronic unit for generating a pressure-dependent output signal or the outputs from which are connected to the electronic unit 9.

The deformation sensor 8 may be, for example, a stretch sensor in the form of a strain gauge, a piezo-electric fiber, a piezo-electric crystal, a piezo-electric resistor, a combination of the above-mentioned elements, or may be constructed in some other suitable fashion. The deformation sensor 8 may be, for example, glued onto the inner side of the sidewall of the tire 6, vulcanized into the tire rubber, attached to the tire carcass, etc. The deformation sensor 8 may have an electrically conducting connection to the electronic unit 9 via conducting tracks which connect the tire to the wheel; it may also contain a transponder, or be connected to a transponder fixed on the tire, which can be interrogated by the electronic unit 9. It is advantageous if the deformation sensor contains a memory module, with tire-specific data such as its type of construction, manufacturer, date of manufacture, desired deformation, desired inflation pressure, in each case as a function of the load, load capacity etc. The tire-specific data can be transmitted to the analysis device together with the output signal from the deformation sensor.

The power supply for the electronic unit 9, for any transponder there may be, and for the transceiver unit 10 fixed to the wheel, can be provided from the transceiver unit 12 that is fixed to the chassis in a non-contact manner. Such contact-free power transfer is known per se. A battery may also be provided, or the tire can provide its own energy supply, as explained later by reference to FIG. 3, from the deformation which its undergoes when it rotates.

The construction and function of the individual elements are known per se, and are therefore not explained in detail.

FIG. 2 shows schematically that it is advantageous to locate the deformation sensor 8 in a region of the sidewall of the tire 6 which is strongly deformed as the vehicle loading varies or for a different tire inflation pressure.

In detail, using the system described schematically by reference to FIG. 1, the following variables can be measured:

The tire inflation pressure is determined by the pressure sensor 4 and is fed via the electronic unit 9 and the transceiver units 10 and 12 to the analysis unit 14, so that it is available there for further processing.

It is advantageous if the tire contains in addition a temperature sensor, not shown, to determine the temperature of the air contained in the tire, which is then transmitted to the analysis device 14, where the tire inflation pressure corresponding to the tire temperature can be related to a reference temperature.

The output signals from the deformation sensor 8 are transmitted in a similar manner, via the electronic unit 9, the transceiver unit 10 and the transceiver unit 12, to the analysis device 14, whereby if the deformation sensor 8 is appropriately constructed with a transponder the values can also be read out directly by the transceiver unit 12 fixed on the chassis. In the filter device 20, the output signals from the deformation sensor 8 are subjected as appropriate either to dynamic filtering, which is advantageously a function of the vehicle or tire speed, as applicable, or to an analysis of the low-frequency signal components, whereby after low-frequency filtering it is possible to generate a signal corresponding to a quasi-static tire deformation, which thus corresponds to the loading on the tire or the wheel concerned, as applicable, and from a signal generated as applicable either by high-frequency filtering, also as a function of the vehicle speed, or by analysis of the high-frequency signal components, it is possible to extract a measure of the dynamic tire deformation, i.e. the deformation of the tire due to the nature of the road surface, from which a signal can be obtained which characterizes the nature of the road surface.

Thus, not only are the tire-specific data available in the analysis device 14, but so also are the tire inflation pressure relative to a standard temperature, the load on the wheel, and the nature of the road surface, as signals for further processing.

It is advantageous if all the wheels of the vehicle are equipped like the vehicle wheel described, so that the corresponding signals from all the vehicle's wheels are available for analysis.

Since the deformation of the tire depends both on the tire inflation pressure and on the loading on the tire, it is advantageous if the memory 24 holds tire-specific sets of characteristics, which are read out as necessary from the memory module fixed to the tire, and which specify the dependencies between the low-frequency deformation signal, averaged if necessary, the tire inflation pressure and the tire loading. These sets of characteristics can also be stored in the form of arithmetic relationships, as formulas. A relationship between road condition and the high-frequency output signal from the deformation sensor 8, determined by the road condition, filtered and subjected if necessary to fine adjustment for the tire loading and inflation pressure, can also be stored in the memory 24.

From the wheel load, determined by reference to the tire deformation and tire inflation pressure, it is possible to determine the loading on the wheel suspension concerned. If other wheels are correspondingly equipped, it is possible to determine the loading on an axle, or for the entire vehicle.

From further sets of characteristics, stored in the memory 24, it is possible to assign a desired tire inflation pressure to each triplet of the values for tire inflation pressure, tire loading and road condition, and to generate a signal in the indication unit 16 if the deviation between the measured tire inflation pressure and the desired tire inflation pressure exceeds a threshold. Obviously, if the vehicle is stationary it is possible to show on the indication unit 16 a desired tire inflation pressure, appropriate to the prevailing circumstances, which is stored for specific tires in the analysis unit 14, which can be set for the types of tire concerned. Thus, when the pressure is being restored, the correct tire inflation pressure can be set. If the system is appropriately constructed, the tire inflation pressure can in each case be adjusted on the vehicle in motion to the desired tire inflation pressure thus determined, with such a tire inflation pressure adjustment device being connected to one of the outputs 26.

An advantageous and particularly simple construction of the system is such that a desired deformation of the tire, possibly dependent on the actual inflation pressure, which is stored for a specific tire and is available in the date memory 24, is compared with the actual deformation. A deviation from this which exceeds a threshold indicates a faulty inflation pressure, which can then be readjusted until there is agreement between the desired and actual deformations. A tire should when running, over the course of a rotation, deform by a certain amount. This ensures a good resilience at the same time as low rolling resistance and low wear on the tire.

It is further possible to use the values determined for tire loading and nature of the road surface, taking into account also the vehicle speed if appropriate, in determining desired values of the parameter settings for the running gear, such as the ground clearance, shock absorption, spring constants etc., which are stored in the memory 24 or can be calculated from appropriate arithmetic relationships. With an appropriate construction of the system, actuators such as the actuator 28 can be adjusted to correspond to the desired values which have been determined. It is apparent that the corresponding adjustment values can be appropriately modified if an incorrect pneumatic pressure is detected.

Further, the magnitudes determined can be used for setting parameters for the braking system and/or a vehicle stability system. For example, the efficiency of the individual wheel brakes can be adjusted for the loading on the individual wheels, preset values for the ABS system can be modified, etc.

FIG. 3 shows a portion of the sidewall 7 of a tire. It shows clearly the deformation sensor 8 which may, for example, be glued along its edges to the inner side of the sidewall, and which is constructed of flexible piezo-fibers, in the form of a flexible strip. This flexible strip deforms when there is a deformation of the sidewall 7, and supplies a voltage which can be taken as a measure of the deformation and can also be converted in an electronic module 30 to electrical energy which serves to supply energy to the electronic module 30, which has a memory module 32 for storing tire-specific data, a pressure sensor, which is not shown, for sensing the inflation pressure in the tire, a temperature sensor for sensing the temperature of the inflation gas in the tire, and a transmit unit with which items of data can be transmitted to the transceiver unit 12 (FIG. 1). All these units are combined into one module or assembly, which is affixed to the inner side of the tire wall. The energy supply can also be provided in other ways, for example by means of a battery or a generator which, using the force of gravity, supplies energy with each rotation of the tire, for example by magnetic induction using an inert mass. Of course, the energy generation unit can also be affixed to the wheel.

The position shown in the figures for the deformation sensor is particularly favorable because of the large deformation of a tire in the region of its sidewall. However, the deformation sensor could be arranged in the region of the treadwall, where deformations also occur during a rotation of the tire.

In summary, using the invention information can be obtained about the loading of a tire and the nature of the road surface from the output signal from a single sensor. The construction of the vehicle monitoring system is thereby simplified, and the system's warning characteristics can be matched to the situation. In all driving situations there is reliable indication of the tire pressure either dropping below a permissible lowest value or going above an excessive value, without issuing a false warning in extreme driving conditions. A determination of the parameters for the load state and nature of the road surface enables other vehicle characteristics or adjustment parameters to be conveniently and automatically set.

This application claims the priority, under 35 U.S.C. § 119, of German patent application No. 103 52 539.4, filed Nov. 11, 2003; the entire disclosure of the prior application is herewith incorporated by reference.

We claim:

1. A system for monitoring a vehicle with pneumatic tires, comprising:
   a pressure sensor disposed to sense a tire inflation pressure of at least one wheel of the vehicle and to output a sensor output signal;
   a deformation sensor for sensing deformations of a tire, joined to a sidewall of the tire at a location that is subject to strong deformation when a pneumatic pressure in the tire is too low in relation to a weight of the vehicle, said deformation sensor generating an output signal in dependence on the deformation of the sidewall;
   an analysis unit;
   a data transmission device for transmitting the sensor output signal of said pressure sensor and the output signal of said deformation sensor to said analysis unit;
   said analysis unit including a filtering device configured to subject the output signal from said deformation sensor to low-frequency filtering in dependence on a speed of rotation of the wheel, to generate a signal substantially corresponding to a quasi-static tire deformation, and to high-frequency filtering in dependence on the speed of rotation of the wheel, to generate a signal characterizing a nature of a road surface.

2. The system according to claim 1, which further comprises a memory module with tire-specific data affixed to the tire, and wherein a content of the memory module is selectively read out via said data transmission device.

3. The system according to claim 2, wherein said analysis device is configured to determine a load on the wheel from the tire inflation pressure, a tire rotation speed signal, and the output signal from said deformation sensor.

4. The system according to claim 3, wherein said analysis device is configured to determine a desired tire inflation pressure from the load on the wheel.

5. The system according to claim 2, wherein said analysis device is configured to determine a desired tire inflation pressure depending on the nature of the road surface.

6. The system according to claim 3, wherein said analysis device is configured to determine a desired tire inflation pressure depending on the load on the wheel, the vehicle speed, and the nature of the road surface.

7. The system according to claim 2, wherein said analysis device is configured to determine a deviation of an actual deformation of the tire from a tire-specific desired deformation thereof.

8. The system according to claim 1, wherein said analysis device is configured to determine desired adjustment values for a running gear of the vehicle, and the adjustment values depend on at least one of a vehicle loading and the nature of the road surface that have been determined.

9. The system according to claim 8, wherein at least one output from said analysis device is connected to at least one actuator for setting at least one parameter of the vehicle.

10. The system according to claim 1, wherein said analysis device is configured to determine desired adjustment values for a braking device and/or drive system on the vehicle, which depend on at least one of a vehicle loading and the nature of the road surface that have been determined.

11. The system according to claim 10, wherein at least one output from said analysis device is connected to at least one actuator for setting at least one parameter of the vehicle.

12. A method of analyzing an output signal from a pneumatic tire deformation sensor affixed on or in a sidewall of the tire that is subject to deformation when a pneumatic pressure value is too low, the method which comprises:

analyzing a low-frequency range of the output signal, correlating with a wheel rotation speed to generate a correlated signal, and averaging the correlated signal to generate an averaged signal, for generating from the averaged signal a signal substantially corresponding to a static loading on the pneumatic tire; and analyzing a high-frequency range of the output signal, correlating with the wheel rotation speed to generate a correlated signal, and generating, from the correlated signal, a signal representing the nature of the road surface.

13. A vehicle tire, comprising: a sidewall subject to sidewall deformation when a tire inflation pressure is insufficient, and a deformation sensor disposed in or on said sidewall of the tire in a region thereof where said sidewall deforms when the tire inflation pressure is insufficient.

14. The vehicle tire according to claim 13, wherein said deformation sensor is a strain gauge, a piezo-electric sensor, or a combination of the two.

15. The vehicle tire according to claim 13, wherein said deformation sensor is integrated to form a unit together with a device for generating electrical energy, a pressure sensor, a memory module for storing tire-specific data, an electronic module, and a transmission unit.

16. A vehicle tire configured for use in the system according to claim 1, comprising: a sidewall subject to sidewall deformation when a tire inflation pressure is insufficient, and the deformation sensor disposed in or on said sidewall of the tire in a region thereof where said sidewall deforms when the tire inflation pressure is insufficient.

17. The vehicle tire according to claim 16, wherein said deformation sensor is a strain gauge, a piezo-electric sensor, or a combination of the two.

18. The vehicle tire according to claim 16, wherein said deformation sensor is integrated to form a unit together with a device for generating electrical energy, a pressure sensor, a memory module for storing tire-specific data, an electronic module, and a transmission unit.

* * * * *